April 23, 1968     E. LIESER ETAL     3,379,107
AUTOMATIC EXPOSURE CONTROL DEVICE FOR PHOTOGRAPHIC CAMERAS
Filed March 8, 1965
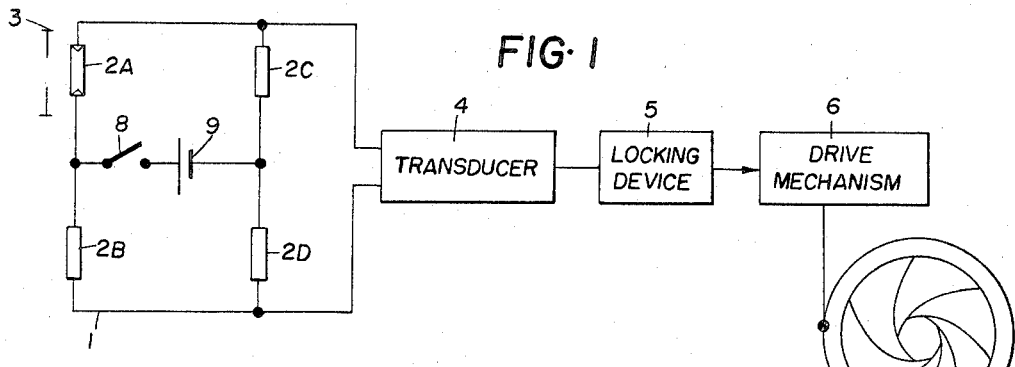
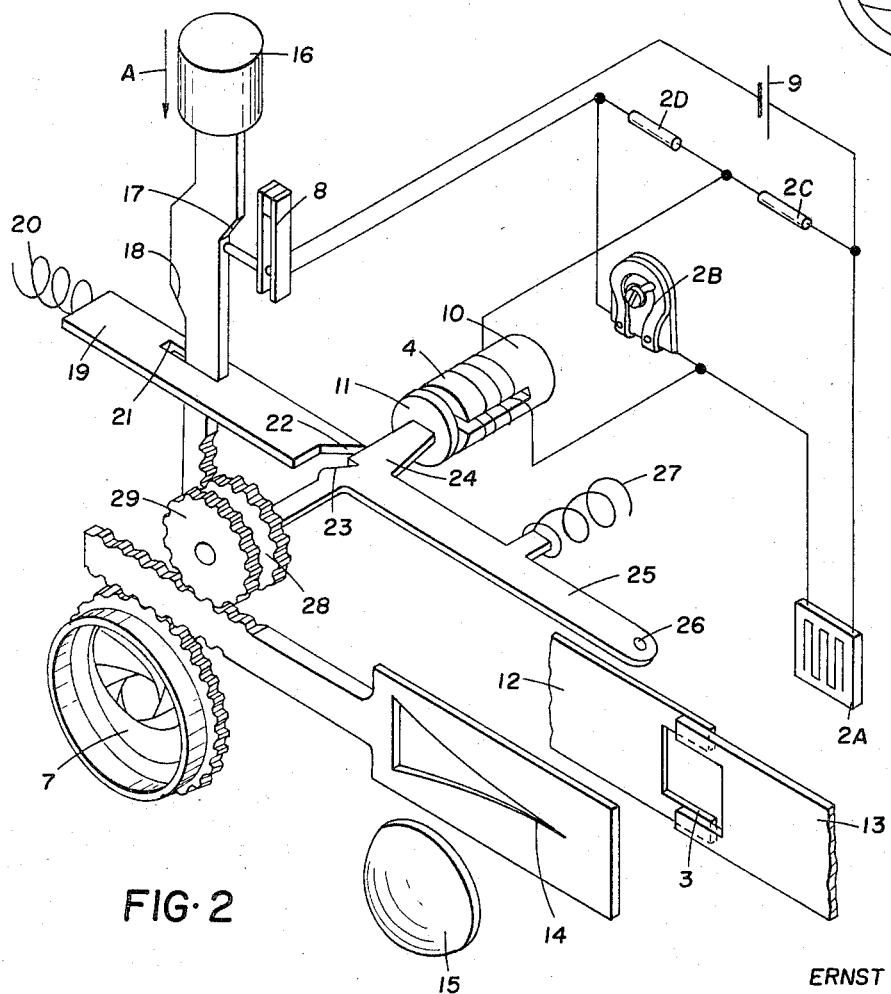
ERNST LIESER
KARLHEINZ HABERLE
INVENTORS
BY
ATTORNEYS

United States Patent Office 3,379,107
Patented Apr. 23, 1968

3,379,107
AUTOMATIC EXPOSURE CONTROL DEVICE
FOR PHOTOGRAPHIC CAMERAS
Ernst Lieser, Stuttgart-Vaihingen, and Karlheinz Häberle, Stuttgart-Wangen, Germany, assignors to Eastman Kodak Company, Rochester, N.Y., a corporation of New Jersey
Filed Mar. 8, 1965, Ser. No. 437,854
Claims priority, application Germany, Apr. 11, 1964, K 52,648
8 Claims. (Cl. 95—10)

ABSTRACT OF THE DISCLOSURE

An automatic control device for photographic cameras wherein a photoresistance element is operatively associated with a bridge circuit to autmatically set the diaphragm aperture opening through an electromechanical transducer means upon depression of a camera shutter actuating mechanism.

---

This invention relates to photographic cameras, and more particularly, to cameras having automatic exposure control systems.

Numerous devices have been proposed in the past for automatically adjusting the diaphragm mechanism of a camera to compensate for scene light conditions at the time the photograph is to be taken. Most mechanisms of this type employ a photoelectric device which is coupled in some manner to the diaphragm of the camera to increase or decrease its aperture size, depending on the precise conditions encountered. Mechanical linkages of various types are normally used to accomplish this end. These linkages are often complex, prone to mechanical failure and operable only within broadly defined limits of accuracy.

Electrical couplings, usually comprising a sensing circuit and reversible electric motor, are also used to regulate aperture size according to scene light conditions. Couplings of this type are easy to place out of adjustment through jarring, dropping etc. due to the inherent sensitivity of the reversible motors normally employed.

It is therefore a primary object of this invention to provide a reliable means for automatically adjusting a camera diaphragm mechanism in response to the scene light conditions encountered.

It is a further object of this invention to provide an automatic exposure control device for a camera comprising a photoresistance element associated with a Wheatstone bridge, the quantity of light striking the light sensitive surface of said photoresistance element being dependent on the object brightness and on the exposure factors that have been set.

An additional object is to provide an automatic exposure control device which is actuated by a camera shutter release mechanism.

A still further object is to provide a locking means for preventing operation of an automatic control device until an associated shutter release mechanism is actuated by the operator.

These objectives have been attained in the present invention by providing an automatic control device for photographic cameras which incorporates a photoresistance element operatively associated with a bridge circuit to automatically set the diaphragm aperture opening through an electromechanical transducer means upon the depression of a camera shutter actuating mechanism.

Other objects of the invention will appear from the following description, reference being made to the accompanying drawings, wherein:

FIG. 1 is a schematic view of an automatic exposure control device embodying the present invention;

FIG. 2 is a view of an embodiment of the invention, showing some components of the embodiment in perspective and other components in schematic fashion.

Referring now to FIGS. 1 and 2, a Wheatstone bridge circuit 1 is shown, having the end points of one bridge diagonal thereof connected to a voltage source 9 in whose circuit switch 8 is arranged. A photoresistance element 2a, which may be a cadmium sulfide cell or other similar device is disposed in one branch of the bridge circuit, while resistors 2b, 2c and 2d constitute the remainder of the bridge. One of the resistor elements, in this case resistor 2b, may be of the variable type to balance the bridge circuit in the conventional manner.

Disposed in front of photoresistance element 2a are a pair of blades 12 and 13 having interengaging forked ends defining an aperture 3. Blades 12 and 13 form a portion of a conventional camera mechanism relating to the setting of values for exposure time and film speed and do not per se relate to the inventive subject matter of the present application. Relative back and forth movement between the two blades increases or decreases the size of aperture 3. The blades may be mounted for reciprocatable movement in the camera housing (not shown) in any suitable manner.

The end points of the branches of the bridge circuit having resistors 2c and 2d therein are connected to electromechanical transducer 4. As may be seen with particular reference to FIG. 2, transducer 4 comprises an electromagnet 10 with a movable armature 11 associated therewith. Armature 11 is fixedly attached to a cross arm 24 having a notch 23 therein for the purpose to be more clearly brought out below. Cross arm 24 is integrally attached to lever 25 which is mounted in the camera housing in any suitable fashion to permit said lever and cross arm to swing about pivot 26. A compression spring 27 is also mounted on the camera housing in any suitable fashion and continually biases lever 25 counterclockwise as viewed in FIG. 2. Mounted for freely rotating movement at the opposite end of cross arm 24 is a pair of gears 28 and 29. Gears 28 and 29 are fixed relative to one another and are free to rotate in coupled fashion on cross arm 24. Gear 29 cooperates with a rack portion of reciprocating mask 14 which has a substantially V-shaped hole therein on the outermost extremity thereof. A light collecting optical element 15 is arranged in front of photoresistance element 2a, aperture 3 and mask 14 in a manner known per se. An additional rack portion on the lower portion of mask 14 cooperates with gear teeth on iris diaphragm 7 to vary the aperture size of said diaphragm upon rotation of its peripheral gear portion in a manner also well known in the art.

Mounted within the camera housing in a conventional manner is shutter release member 16 which has cam portions 17 and 18 thereon for the purpose which will be more fully brought out below. Release member 16 extends into an elongated opening 21 of locking device 19 which is mounted by any desired means for reciprocatable movement. A projection 22 is integrally formed on locking device 19 and is continually biased toward cross arm 24 and associated notch 23 by virtue of coil spring 20. The lowermost extent of release member 16 has a toothed portion thereon for selective engagement with gear 28.

The embodiment of the invention as described in FIGS. 1 and 2 operates as follows. Before an exposure is to be made, the exposure factors that remain constant during the camera release have to be set. Thus blade 12 may be positioned through any conventional linkage means to correspond to the selected exposure time desired by the camera operator. In like manner, blade 13 may be positioned through any desirable linkage means to correspond to the speed of the film in the camera. Since these settings remain constant throughout the operation of the camera, it may easily be seen that the only exposure factor that varies during the camera release is that of the lens diaphragm aperture value.

After the above settings have been made, shutter release member 16 is depressed by the operator in the direction of arrow A in the usual manner. Cam surface 17 of the shutter release member thereupon contacts a protruding element on switch 8 to close said switch, thus energizing the aforesaid described bridge circuit. In the initial stage of operation of the device it will be noted that mask 14 totally blocks off incident light to photoresistance element 2a. In the initial stages of depression of shutter release member 16, armature 11 is held against electromagnet 10 due to the fact that projection 22 of locking device 19 is held in notch 23 of cross arm 24 under the influence of coil spring 20. When cross arm 24 is held in this position, gear 28 is in engagement with the toothed portion of release member 16. Depression of the release member, therefore, in addition to energizing the bridge circuit, causes gears 28 and 29 to rotate in a counterclockwise fashion (FIG. 2) and the V-shaped hole of mask 14 to commence moving into the line of sight of optical member 15, aperture 3 and photoresistance element 2a. As more of the V-shaped hole moves into this area, more and more scene light passing through optical member 15 is allowed to pass through mask 14, aperture 3, and thence to photoresistance element 2a. Coextensive with movement of mask 14 toward the right (FIG. 2), the iris diaphragm aperture size continues to increase through the means of the cooperating gearing between said mask and said iris diaphragm. Switch 8 remains in closed position for the full extent of downward movement by release member 16.

As release member 16 continues downwardly, cam surface 18 contacts locking device 19 at the surface defining the left edge of elongated opening 21 (FIG. 2). Locking device 19 is moved to the left causing coil spring 20 to compress and projection 22 to be moved out of engagement with notch 23. as long as the bridge remains in its unbalanced state and current flows through the wire coils associated with electromagnet 10, the armature 11 will be retained against the electromagnet 10. Once, however, the bridge becomes balanced due to the decreased resistance of photoresistance 2a because of the increasing amount of light falling thereupon, armature 11 will no longer be attracted to electromagnet 10 and lever 25 will rotate about pivot 26 under the influence of compression spring 27. Gear 28 is consequently disengaged from the toothed portion of release member 16 thereby halting movement of mask 14 as well as the iris diaphragm mechanism. It may thus be seen that the diaphragm is automatically opened and set at a value taking into consideration the exposure time and film speed values that have been set as well as the scene brightness at the moment the photograph is to be taken. It is of course understood that continued downward motion of the release member actuates the camera shutter (not shown) through any conventional linkage. Any desired means (not shown) may be utilized to return the various elements of the mechanism to their initial positions after the shutter has been released and prior to a subsequent shutter release.

Although only one specific embodiment of the present invention is disclosed herein, it should be understood that the particular form disclosed has been selected to facilitate explanation of the invention rather than to limit the number of forms which it may assume. Further, it should be understood that various modifications, alterations, and adaptations may be applied to this specific form described to meet the requirements of practice without in any manner departing from the spirit or scope of the present invention.

What is claimed is:
1. In a photographic camera having a shutter, an automatic control system comprising:
   a shutter release member movable from a first position to a second position;
   photoresponsive means including a photoresistance element;
   a variable lens diaphragm mechanism;
   a movable element;
   first means associated with said movable element for positioning said variable lens diaphragm mechanism as a function of the position of said movable element;
   second means associated with said movable element for regulating the amount of incident light falling on said photoresistance element as a function of the position of said movable element;
   coupling means for releasably coupling said movable element and said shutter release member, said coupling means having a coupling position for coupling said movable element to said shutter release member to effect movement of said movable element with said shutter release member, said coupling means being adapted to move in a predetermined direction from said coupling position to uncouple said movable element and said shutter release member; and
   positioning means associated with said photoresponsive means to directly move said coupling means in said predetermined direction to directly uncouple said movable element from said shutter release member when the resistance of said photoresistance element is equal to a predetermined value.

2. An automatic control system as claimed in claim 1 wherein said second means includes a substantially V-shaped aperture formed on a portion of said movable element.

3. An automatic control system as claimed in claim 1 further including a locking device for preventing movement of said coupling means and said movable element until said shutter release member is moved from said first position and toward said second position.

4. An automatic control system as claimed in claim 3 wherein said locking device has a projection and wherein said coupling means has a notch which is selectively engaged by said projection to prevent operation of said coupling means until said shutter release member is moved from its first position.

5. An automatic control system as claimed in claim 4 wherein a spring means is provided to normally urge said projection into said slot and wherein said shutter release member has a cam element thereon to abut against a portion of said locking device to withdraw said projection from said notch as said shutter release member moves from said first position toward said second position.

6. An automatic control system as claimed in claim 1 further including:
   rack means on said movable element;
   said coupling means including a lever having gear means rotatably mounted thereon to engage said rack means on said movable element and an armature attached to said gear means;
   a toothed portion on said shutter release member for releasably engaging said gear means;
   said photoresponsive means including a bridge circuit having a balanced condition and an unbalanced condition; said bridge circuit comprising an electromagnet and said photoresistance element;
   said positioning means including a biasing means connected to said lever to directly move said coupling means in said predetermined direction to uncouple said movable element and said shutter release member when said bridge circuit is in said balanced condition; said electromagnet being adapted to attract said armature when said bridge circuit is in said unbalanced condition whereby said coupling means is directly moved to said coupling position.

7. An automatic control system as claimed in claim 6 further including means for electrically energizing said bridge circuit when said shutter release member is moved from said first position.

8. The automatic control system in claim 6 wherein a second gear means is provided for adjusting said variable lens diaphragm and wherein said rack means comprises a double rack; one rack of said double rack engaging said second gear means for adjusting said variable lens diaphragm mechanism, the other rack of said double rack engaging the first said gear means rotatably mounted on said lever.

References Cited
UNITED STATES PATENTS

| | | | |
|---|---|---|---|
| 3,000,281 | 9/1961 | Rentschler | 95—64 X |
| 3,027,818 | 4/1962 | Lee et al. | 95—10 |
| 3,116,659 | 1/1964 | Waroux | 95—64 X |
| 3,253,523 | 5/1966 | Hutchinson | 95—64 X |

NORTON ANSHER, *Primary Examiner.*

JOSEPH F. PETERS, *Assistant Examiner.*